Oct. 29, 1968          J. MULLER          3,407,426

APPARATUS FOR AUTOMATICALLY CLEANING WINDSHIELDS

Filed Jan. 5, 1966          2 Sheets-Sheet 1

INVENTOR
JACQUES MULLER
BY
ATTORNEY

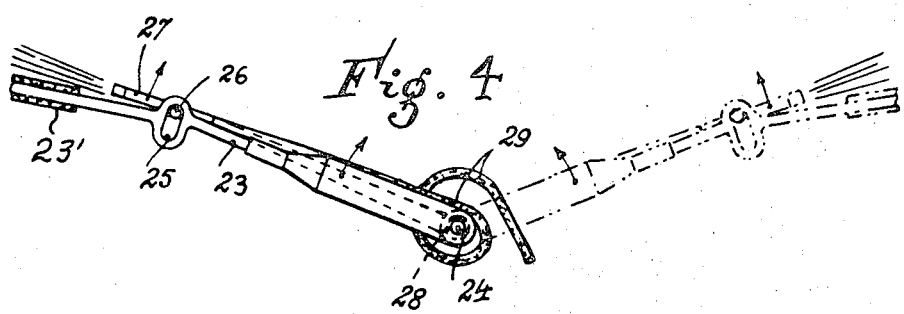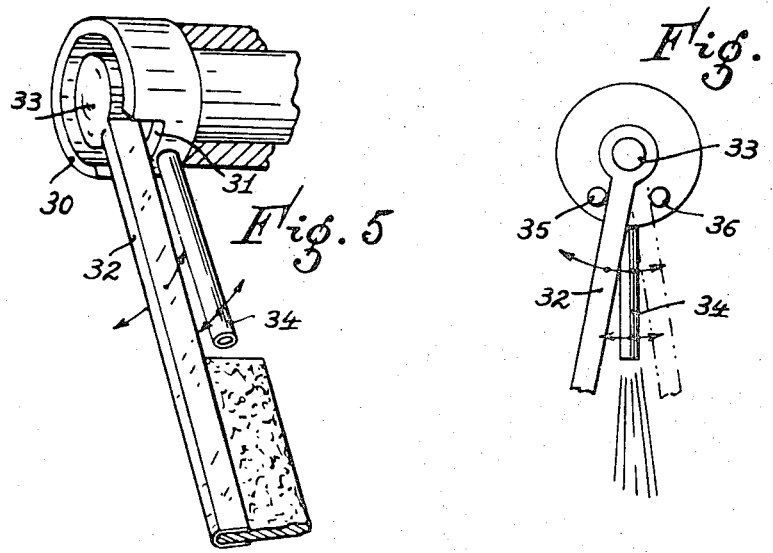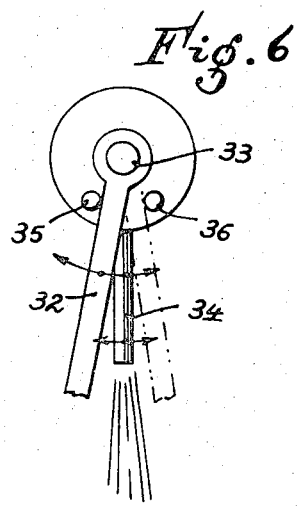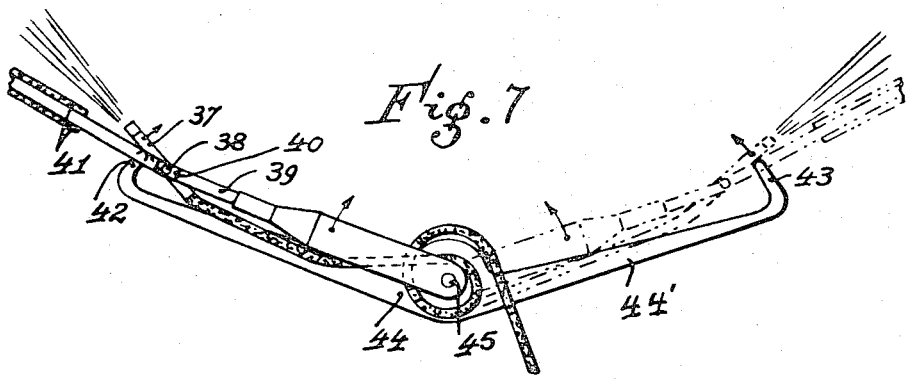

United States Patent Office 3,407,426
Patented Oct. 29, 1968

3,407,426
APPARATUS FOR AUTOMATICALLY
CLEANING WINDSHIELDS
Jacques Muller, 123 Ave. du General de Gaulle,
La Garenne-Colombes, France
Filed Jan. 5, 1966, Ser. No. 518,817
Claims priority, application France, Jan. 20, 1965,
2,531; Mar. 11, 1965, 8,737
4 Claims. (Cl. 15—250.04)

ABSTRACT OF THE DISCLOSURE

This invention relates to the art of windshield wipers and more particularly to windshield wipers having associated water ejection means, said injection means beings arranged to eject water onto the windshield onto alternate sides of the windshield wiper blade as the latter is oscillated.

---

As conducive to an understanding of the invention, it is noted that windshields of automobiles or other vehicles frequently become covered with dirt, dust, insects and the like while the vehicle is moving and it is necessary for the driver to clean the windshield to insure good visibility.

Where a water spraying device is used to eject a quantity of water onto the windshield so that the windshield wiper when it oscillates will more readily be able to clean the foreign matter from the windshield and the driver of the vehicle must continuously press the button or actuate a pump to provide the spray of water on the windshield, such operation immobilizes one hand of the driver, so long as he is actuating the device, with resultant driving hazard.

Where the spraying device is rigidly affixed to the body of the vehicle and ejects a jet of water against substantially one fixed small area on the windshield, this may cause the wiper when it oscillates, to clean only a portion of the windshield as the majority of the water ejected against the windshield will be immediately wiped therefrom by the windshield wiper as it passes over such small area.

It is accordingly among the objects of the invention to provide a windshield cleaning device which is small, compact, relatively simple in construction and which will provide dependable cleaning of the entire area of the windshield traversed by the oscillating wiper with a simple and momentary manipulation by the driver and which will automatically turn off after a predetermined period of time sufficient to insure complete cleaning of such windshield.

Another object is to provide a pump to be incorporated in the device of the above type, which pump is small, compact, relatively simple in construction and which may be automatically actuated to provide metered quantities of liquid at relatively high velocity and which may readily be adjusted to afford such metered quantity of liquid.

According to the invention, these objects are accomplished by the arrangement and combination of elements hereinafter described and more particularly recited in the claims.

Figure 1:
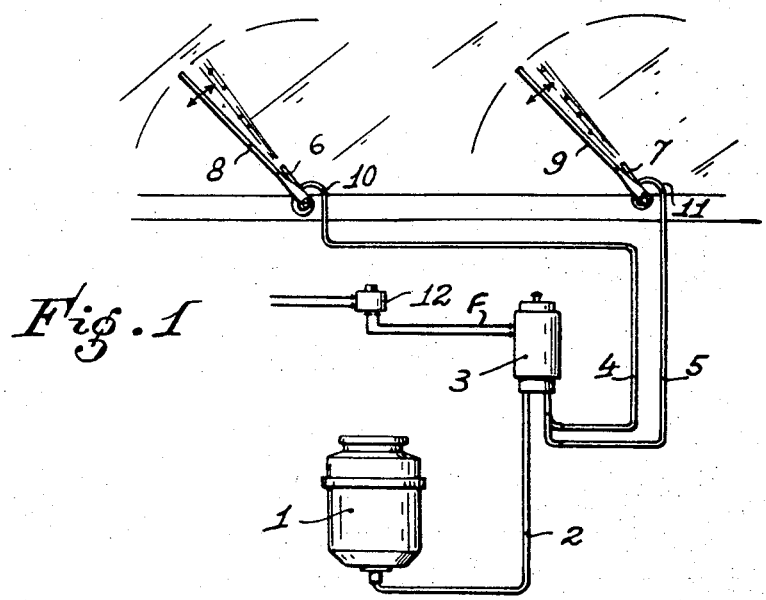
Figure 3:
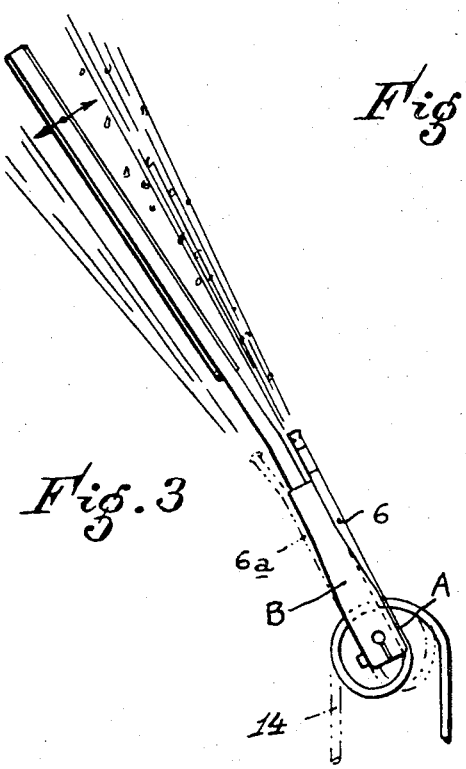
Figure 2:
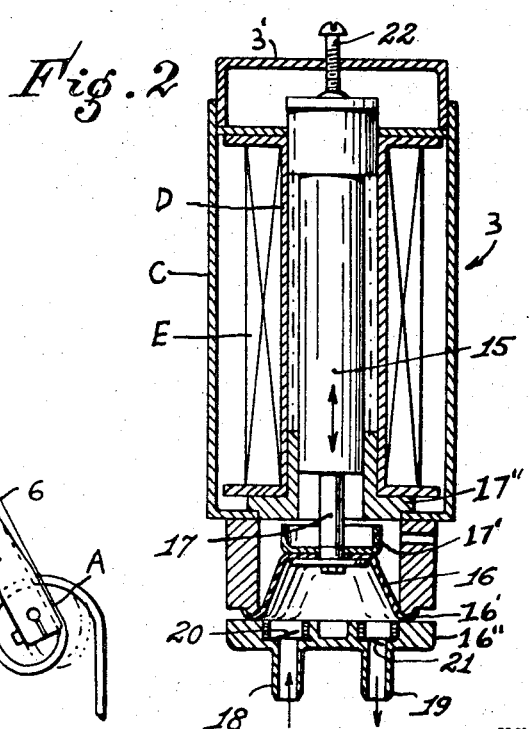

In the accompanying drawings in which are shown one or more of various possible embodiments of the several features of the invention:

FIG. 1 is a diagrammatic view of the device installed on a vehicle,

FIG. 2 is a longitudinal sectional view on an enlarged scale of the pump used in the device, FIG. 3 is a diagrammatic view on an enlarged scale of a windshield wiper provided with water ejection nozzles, FIG. 4 is a diagrammatic view similar to FIG. 3 of another embodiment of the invention, FIG. 5 is a fragmentary perspective view of still another embodiment of the invention, and FIGS. 6 and 7 are diagrammatic views of still two other embodiments of the invention.

Referring now to the drawings, in which the invention is illustratively shown incorporated on an automobile winshield wiper, the device comprises a water container 1 connected by a conduit 2 to the inlet 18 of a pump 3. The outlet 19 of the pump 3 has connected thereto conduits 4 and 5 which lead to the respective conventional windshield wipers 8 and 9 of the automobile.

The end 10 and 11 of each of the conduits 4 and 5 which extend through the body of the automobile adjacent the windshield is in the form of a spiral as is clearly shown in FIG. 3 and the free end of the spiral is secured in any suitable manner as at A to the conventionally pivoted base portion B of the windshield wipers 8 and 9. The spiral portions 10 and 11 of each of the conduits terminates in a rigid nozzle 6 and 7 which extends substantially longitudinally of the associated windshield wiper on one side thereof.

The pump 3 in FIG. 2 comprises a cylindrical casing C in which is positioned and extends axially thereof, a cylindrical sleeve D. Slidably mounted in the sleeve D for reciprocating movement is an armature 15, the sleeve D being encompassed by a coil E, the terminals of which are connected by wires F to a control member 12 which illustratively may include a time delay and intermittent-circuit breaker mechanism (not shown). Thus, when the push button 12' of the control member 12 is actuated, the electric current to the coil E will be intermittently turned on and off for such predetermined period of time.

As is shown in FIG. 2, the upper end of the armature 12 mounts an axial adjustment screw 22 which extends through the upper 3' of the pump. Thus, by rotation of the screw 22, the downward movement of the armature may be limited. The lower end of the armature 15 has an axial rod 17 secured thereto at one end, the other end of which extends through the top wall of an inverted cup-shaped diaphragm 16, the periphery 16' of which is clamped against the bottom plate 16" of the pump. Upward movement of the armature is restricted by the abutment of the cup-shaped flange 17' against a transverse wall 17'''.

The bottom plate 16'', which has the inlet and outlet ports 18 and 19, has associated flap valves 20 and 21 mounted in reverse direction and in communication with the chamber G defined by the diaphragm 16. Thus, when the diaphragm is moved upwardly by the armature 15 to the position shown, the valve 20 will be opened to provide suction to port 18 and the valve 21 will be closed and when the diaphragm 16 is moved downwardly by the armature the valve 20 will be closed and the liquid drawn into chamber G from the fluid container 1 will be expelled through the now open valve 21 and the port 19, through conduits 4 and 5 to the nozzles 6 and 7.

In the operation of the device above described, it is apparent that when the operator of the automobile wishes to clean the windshield he need momentarily press the push button 12'. This will immediately apply electric current intermittently and for a predetermined period to the coil E of the pump so that its armature will reciprocate for such predetermined period of time.

As a result of the reciprocation of the armature, liquid will be ejected in spurts through outlet 19 of the pump and through the nozzles 6 and 7. As these nozzles eject liquid against the windshield, always on one side of the wiper and as the wiper is being oscillated, it is apparent that in one sweep of the wiper from one side to the other there will be a fully lubricated surface over which the wiper blade will pass to insure dependable cleaning of the entire area of the windshield traversed by the wiper blade.

In the embodiment shown in FIG. 3, a second nozzle 6a and associated conduit 14 may be associated with each wiper on the side thereof opposed to the nozzle 6. The conduit 14 may also be connected to the outlet port 19 of the pump. With this arrangement, the windshield surface traversed by the wiper blade on both sides thereof will be fully lubricated as the wiper blade oscillates.

In the embodiment shown in FIG. 4 the windshield wiper 23 has a lost motion slot 25 between the wiper blade 23' and the pivotal axis 24 of the wiper 23. The nozzle 27 which is at the end of the flexible conduit 29 is mounted independently of the wiper 23 on a freely pivoting shaft 28. The nozzle 27 adjacent its outlet end carries a stud 26 which extends through the lost motion slot 25.

With the arrangement above described, it is apparent that as the wiper 23 is oscillated from the left hand position shown in full lines in FIG. 4 to the right hand position shown in broken lines, the nozzle 27 will not move until the end of the lost motion slot 25 engages the stud 26 at which time the nozzle 27 will be on the opposite side of the wiper blade. Thus, as the wiper blade is oscillated from side to side, the nozzle 27 will lubricate the surface of the windshield traversed by the wiper blade on the side thereof opposed to the surface then being traversed by the blade. With this arrangement there will be a completely wetted or lubricated surface available to be traversed by the blade 23' when it starts to move across the surface of the windshield.

In the embodiment shown in FIG. 5 the wiper 32 is oscillated in conventional manner. The shaft 33 of the wiper 32 is encompassed by a collar 30 which has an elongated arcuate notch 31 through which the arm of the wiper 32 extends. The collar 30 is freely mounted and carries a nozzle 34. Thus, as the wiper 32 is oscillated, the arm thereof will engage the ends of the notch 31 to cause movement of the nozzle with the wiper blade, but on alternate sides thereof in the same manner as the embodiment of FIG. 4.

The embodiment of FIG. 6 is similar to that of FIG. 5 except that instead of the notch 31, two spaced studs 35 and 36 are provided on the collar 30 carrying the nozzle 34, so that movement of the nozzle to alternate sides of the wiper blade will be accomplished as the wiper blade is reciprocated.

In the embodiment shown in FIG. 7 the windshield wiper 39 is of conventional type except that it carries the nozzle 37 pivotally mounted thereon as at 38, such pivotal mount being secured to the wiper 39 as by a supporting ring 40. Associated with the wiper 39, which oscillates on a shaft 45, are oppositely extending arms 44, 44' each of which at its free end carries a projecting abutments 42, 43. The abutments are designed to be engaged by the portion of the nozzle 37 adjacent its free end so that as shown in FIG. 7 in full lines, when the wiper 39 is in the left hand position, the abutment 42 will be engaged by the nozzle 37 to pivot the latter so that it directs the jet of water on one side of the wiper blade 41 and when the wiper arm is in the right hand position shown in broken lines, the abutment 43 will be engaged by the nozzle 37 to pivot the latter so that it directs the jet of water on the other side of the wiper blade 41. It is to be noted that the pivotal connection of the nozzle 37 to the wiper blade is such that the nozzle will remain in set position until it is forceably pivoted by the abutments 42, 43.

With the constructions above described, a simple yet highly efficient spraying device for windshield wipers is provided which will insure complete lubrication of the entire area of the windshield traversed by the wiper blades.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A device of the character described for cleaning a windshield of a vehicle, comprising a windshield wiper comprising an arm pivotally mounted at one end to the body of the vehicle for oscillatory movement and carrying a wiper blade at its other end, a nozzle mounted independently of said windshield wiper and extending substantially longitudinally thereof and arranged to direct a jet of water onto the windshield to the rear of said wiper blade and means to effect movement of said nozzle from one side of said wiper blade to the other side as said windshield wiper is oscillated.

2. A device of the character described for cleaning a windshield of a vehicle, comprising a windshield wiper comprising an arm pivotally mounted at one end to the body of the vehicle for oscillatory movement and carrying a wiper blade at its other end, a nozzle mounted independently of said windshield wiper and extending substantially longitudinally thereof and arranged to direct a jet of water onto the windshield on at least one side of said wiper blade, means to effect movement of said nozzle from one side of said wiper blade to the other side as said windshield wiper is oscillated, said means comprising a collar freely mounted on an axis concentric with the pivotal mount of said windshield wiper, said nozzle being carried by said collar, said collar having a notch through which said windshield wiper arm extends whereby as said windshield wiper is oscillated from side to side the respective ends of said notch will engage said wiper arm to move the nozzle from one side of the wiper blade to the other.

3. A device of the character described for cleaning a windshield of a vehicle, comprising a windshield wiper comprising an arm pivotally mounted at one end to the body of the vehicle for oscillatory movement and carrying a wiper blade at its other end, a nozzle mounted independently of said windshield wiper and extending substantially longitudinally thereof and arranged to direct a jet of water onto the windshield on at least one side of said wiper blade, means to effect movement of said nozzle from one side of said wiper blade to the other side as said windshield wiper is oscillated, said means comprising a collar freely mounted on an axis concentric with the pivotal mount of said windshield wiper, said nozzle being carried by said collar, said collar having a pair of spaced studs straddling said windshield wiper arm, whereby as said windshield wiper is oscillated from side to side the respective studs will engage said wiper arm to move the nozzle from one side of the wiper blade to the other.

4. A device as set out in claim 1 in which the means for effecting the movement of the nozzle comprises an elongated lost motion slot in said wiper arm, said nozzle adjacent its free end carrying a stud riding in said slot, said slot extending at substantially right angles to said nozzle whereby as said windshield wiper is oscillated from side to side the respective ends of said slot will engage said stud to move the nozzle from one side of the wiper blade to the other, and means to eject water through said nozzle for a predetermined period of time as said wiper is oscillated.

References Cited

UNITED STATES PATENTS

| | | | |
|---|---|---|---|
| 2,648,865 | 8/1953 | Gordon et al. | 15—250.04 |
| 2,763,023 | 9/1956 | Horton | 15—250.04 |
| 2,835,916 | 5/1958 | Mittag et al. | 15—250.04 |
| 3,008,170 | 11/1961 | Marks | 15—250.04 |
| 3,152,726 | 10/1964 | Chivers | 15—250.02 |

FOREIGN PATENTS 966,176    8/1964    Great Britain.

WALTER A. SCHEEL, *Primary Examiner.*

R. SMITH, *Assistant Examiner.*